266-287. OR X7,642
E. Nott.
Gas Furnace.
Patented Jun. 29, 1833.
X 7642.
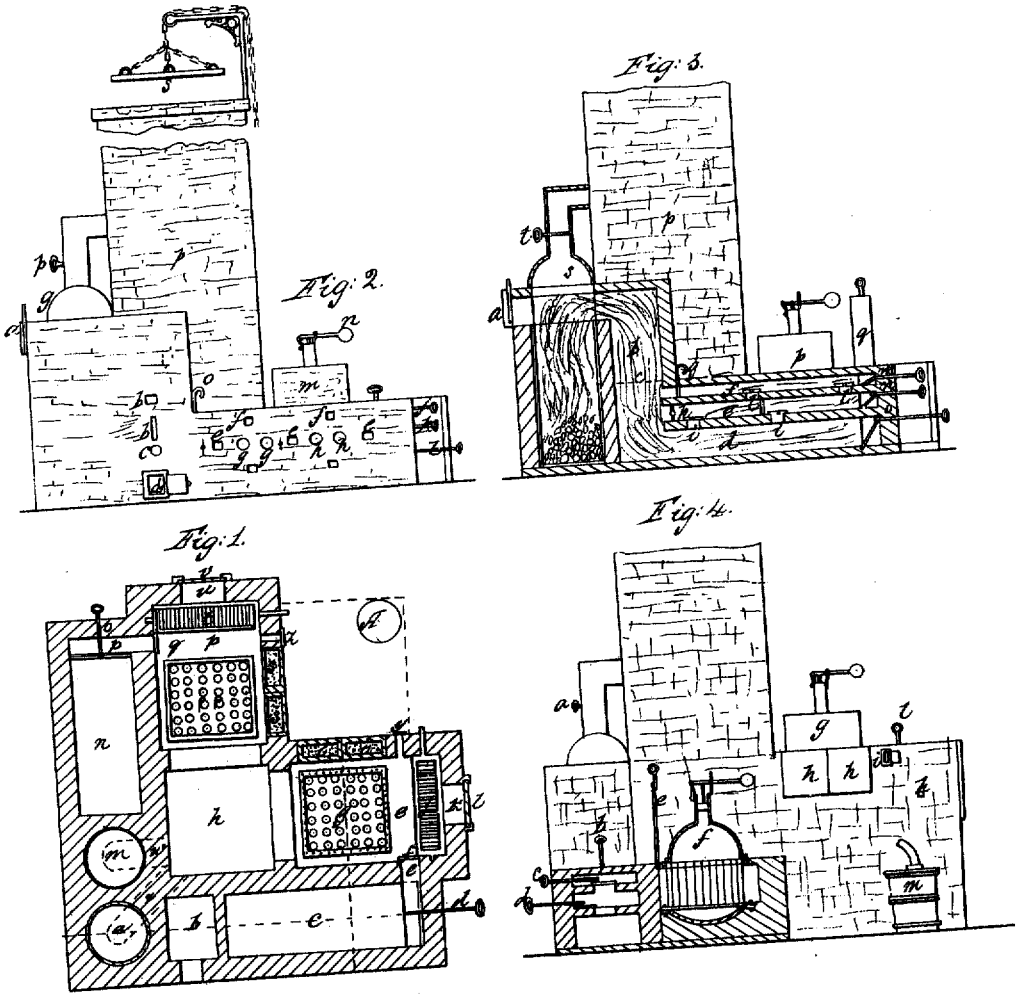

7C42X June 29 1833 209

Eliphalet Nott

Case "8"

Letters Patent.

The schedule referred to in these Letters Patent and making part of the same, containing a description in the words of the said Eliphalet Nott himself of his improvement, in the construction, and adjustment of the brick forming the flue employed in confining combustion to the base of the fuel contained in anthracite coal stoves.

---

Case "No 8."

Specification of an improvement made in the construction and adjustment of the brick forming the flue employed in confining combustion to the base of the fuel contained in Anthracite coal stoves.

---

"Whereas, in such stoves, the front brick of the flue by which the outlet for flame, at the bottom of the chamber of combustion is formed, usually burns away sooner than any other brick; and whereas, in repairing the same inconvenience has arisen from the confinement of the ends thereof in the side walls of said chamber, Therefore an improvement has been introduced and the same having been tested and perfected by repeated experiments, is now intended to be introduced into general use — which improvement consists: In making use, in constructing the front of said flue, of brick, or slabs of other incombustible material which extend merely across the calibre of the chamber of combustion, in place of brick as heretofore extending beyond and entering the side walls by which said calibre is formed — Also in making use, in constructing the ends of said flue of right and left jamb brick, from the internal face of which brackets or [illegible] project inward at the proper place, and of the

[illegible] 76427 the proper form, and to the proper extent, for receiving and sustain
ing in place the brick forming said front flue;— in such manner
that the same shall make a good fit, and at the same time be re
moveable at pleasure, without disturbing any other brick; wh
will be the more easily effected, if a rabbet in brick be also
projected from the right and left jamb aforesaid, for the end
of the brick, (forming said front of flue) when in place to rest
against. It is to be understood, however, that these rabbe
may when preferred, be projected in iron from the side plate
For further information reference may be had to the drawing
here unto appended.

Summary.— —

The improvement herein contemplated consists in providin
for removing and restoring the front of the interior flue [illegible]
aforesaid, without disturbing the remainder of the brick
or stonework:— By so shortening the brick of which said front is
formed, that the same will freely enter the calibre of the chamb
of combustion; and by projecting brackets or recesses from the righ
and left jamb brick of said flue, for the front brick thereof to
stand on;— And also a rabbet for the ends of the same to rest
against.— except when such rabbet is otherwise provided by a
projection in iron from the side plates.

I therefore claim as my invention and improvement,
the providing for removing and restoring the front of flue afo
said by shortening the brick or other slabs of which the same
is composed, so that they will freely enter the calibre of the
chamber, and by projecting from the right and left jamb
brick, the requisite [illegible] or other fixture for sustaining an
confining the same in place as aforesaid;— together with the
uses to which said improvement has been or may hereafter be
applied in stoves or furnaces.

[illegible] Witnesses
[illegible] [illegible]
[illegible] Boyd

Eliphalet Nott

Dr. in portfolio ([illegible])